United States Patent
Rosenzweig

(10) Patent No.: US 7,303,613 B2
(45) Date of Patent: Dec. 4, 2007

(54) FILTER SENSOR AND INDICATOR FOR VACUUM CLEANERS

(75) Inventor: Mark Rosenzweig, Chestnut Hill, MA (US)

(73) Assignee: Euro-Pro Operating, LLC, West Newton, MA (US)

( * ) Notice: Subject to any disclaimer, the term of this patent is extended or adjusted under 35 U.S.C. 154(b) by 133 days.

(21) Appl. No.: 10/733,851

(22) Filed: Dec. 11, 2003

(65) Prior Publication Data

US 2005/0126397 A1 Jun. 16, 2005

(51) Int. Cl.
*B01D 46/00* (2006.01)
*B01D 46/42* (2006.01)
*A47L 9/19* (2006.01)

(52) U.S. Cl. .............. 96/421; 96/417; 96/418; 96/419; 55/385.1; 55/DIG. 3; 55/DIG. 34; 15/339; 15/347; 116/268; 116/DIG. 25; 73/31.04; 73/37

(58) Field of Classification Search ............. 96/417, 96/418, 419, 421, 424; 55/385.1, DIG. 3, 55/DIG. 34; 95/1, 19; 116/268, 283, DIG. 25; 15/319, 339, 347, 352; 73/31.04, 31.05, 73/37

See application file for complete search history.

(56) References Cited

U.S. PATENT DOCUMENTS

| | | | | |
|---|---|---|---|---|
| 2,203,171 A | * | 6/1940 | Martinet ................. | 15/339 |
| 2,320,368 A | * | 6/1943 | Leathers ............. | 55/DIG. 34 |
| 3,172,743 A | * | 3/1965 | Kowalewski ............. | 96/418 |
| 3,381,652 A | * | 5/1968 | Schaefer et al. .......... | 116/268 |
| 3,934,543 A | | 1/1976 | Howard | |
| 3,936,284 A | * | 2/1976 | Mason ..................... | 96/421 |
| 4,199,838 A | * | 4/1980 | Simonsson ............... | 96/421 |
| 4,233,597 A | * | 11/1980 | Kurz ....................... | 96/421 |
| 4,294,595 A | * | 10/1981 | Bowerman ................ | 96/417 |
| 4,342,133 A | * | 8/1982 | Minton ............... | 55/DIG. 34 |
| 4,733,430 A | * | 3/1988 | Westergren ............... | 96/421 |
| 4,733,431 A | * | 3/1988 | Martin .................... | 96/421 |
| 5,351,035 A | * | 9/1994 | Chrisco ................... | 340/607 |
| 5,718,822 A | * | 2/1998 | Richter ................... | 96/421 |
| 5,917,141 A | * | 6/1999 | Naquin, Jr. ............... | 96/417 |
| 6,167,588 B1 | | 1/2001 | Dyson | |

FOREIGN PATENT DOCUMENTS

| | | | |
|---|---|---|---|
| DE | 36 29 346 A1 | | 3/1988 |
| DE | 36 43 378 A1 | * | 6/1988 |
| EP | 0 390 956 A1 | | 10/1990 |

* cited by examiner

*Primary Examiner*—Jason M. Greene
(74) *Attorney, Agent, or Firm*—Greenberg Traurig, LLP; Michael I. Wolfson; Sylvia Tan

(57) ABSTRACT

A pressure actuated electrical switch and indicator to indicate to a user that a filter vacuum cleaner requires cleaning or replacing. In a first embodiment, the pressure actuated electrical switch measures the pressure present between the filter media and the flow inducing device to determine whether a minimum absolute pressure threshold has been exceeded. The pressure actuated switch has a chamber with two electrical leads that are connected when the pressure in the vacuum cleaner raises above a predetermined level. A tube from the chamber to the vacuum cleaner housing draws a conductive part into contact with both leads. In additional embodiments, the pressure measure is the difference in air pressure above and below the filter media, or the difference in air pressure between the pressure in the air stream between the filter media and the flow inducing source, and the ambient air pressure.

5 Claims, 4 Drawing Sheets

FILTER SENSOR AND INDICATOR FOR VACUUM CLEANERS

BACKGROUND OF THE INVENTION

The invention relates generally to vacuum cleaners, and more particularly to a monitor for sensing the condition of a filter associated with a vacuum cleaner.

Vacuum cleaners are used to pick up a wide variety of items from a surface. The vacuum cleaners work by creating an air flow across the surface, causing dirt particles to be entrained in the air flow. The air flow may then be drawn past or through a filtering device to remove such entrained particles from the air stream. The air stream may then be vented.

Inducing the air flow is typically accomplished through the use of a motor driving a fan or impeller. Other well known means of generating the air flow are known in the industry, and are accordingly not described in greater detail here. The amount of energy necessary to generate the air flow is dependant on the amount of air required, as well as flow losses associated with the flow of the air stream across a surface being vacuumed, and across the filter. The amount of air required is a function of the cross sectional area of the air inlet adjacent to the surface being vacuumed, as well as the required velocity of the air across the surface being vacuumed. The higher the air velocity, the more likely that dirt will become entrained within the air stream, and thus be picked up from the surface.

A significant impact on the flow of the air stream, however, is the efficiency with which the air can pass through any filter media in the air stream. The impact on flow tends to be inversely proportional with the effectiveness of the filter in removing entrained particles from the air stream, i.e., the more effective the filter is at removing particles, the greater the flow loss that must be overcome by the device inducing the air flow. Furthermore, the flow loss across the filter may increase as the filter becomes clogged with particles that have been removed from the air stream.

As the flow loss caused by the filter increases, such as when the filter becomes full of collected particles or material, the motion of the air stream is impeded, typically such that the air stream comprises a smaller volume of air for a given period of time. Additionally, a greater pressure drop will occur across the filter as the filter creates a greater impedance to the flow of air.

As the impedance to flow increases, the amount of air being drawn through the air inlet by the flow inducing device decreases, the velocity of the air stream at the suction entrance of the vacuum cleaner decreases, decreasing the effectiveness of the vacuum cleaner. This decreased effectiveness may be wasteful of energy, to whit, that more time must be spent across a given area to successfully clean the area, as well as be frustrating for the operator of the vacuum cleaner. Accordingly, the ability to detect and signal such a reduced effectiveness to an operator is important Prior art devices utilize a mechanical pressure gauge calibrated to indicate the increase in a pressure drop according to the condition of the filter. Such devices may show a range of the gauge indicator as being unsatisfactory, however the lack of a discrete indication leads to use of the vacuum cleaner in the inefficient, clogged filter condition, since the operator is not provided with a discrete signal that the filter must be cleaned or changed.

Accordingly, it is desirable to provide a filter sensor and monitor that effectively signals to a user that it is time to address the condition of the filter.

SUMMARY OF THE INVENTION

A pressure actuated electrical switch and an indicator to indicate that the filter media in use in a vacuum cleaner requires cleaning or replacement is provided. In a first embodiment, a pressure actuated electrical switch response to an increase in pressure drop across a filter media after a minimum threshold has been exceeded. Once the pressure downstream of the filter decreases beyond the selected threshold, the monitor switch is closed and the monitor indicates to the user that the filter requires attention. In additional embodiments, the pressure actuated electrical switch measures the difference in air pressure upstream and downstream of the filter media, or the difference in air pressure downstream of the filter media and the flow inducing source and the ambient air.

The monitor includes a pressure sensitive electrical switch between a power source and a visible light. The switch includes a cavity having two electrical contacts and a conductive diaphragm biased in an open position and an inlet port below the diaphragm. The port is coupled to the chamber downstream of the filter and upstream of the motor. As the filter becomes filled and the pressure drop across it increases, the washer overcomes the bias to close the two contacts and turn on the monitor light.

Accordingly, it is an object of the invention to provide an improved monitor for signaling that the filter in a vacuum cleaner requires cleaning or replacement.

It is another object of the invention to provide an improved switch for a vacuum cleaner monitor to insure the condition of the filter.

It is a further object of the invention to provide an improved vacuum cleaner with a monitor to signal that the filter requires attention.

Yet a further object of the invention to provide an improved vacuum cleaner with a pressure sensitive switch to close a circuit to energize an indicator to signal that the filter requires attention.

Still other objects and advantages of the invention will in part be obvious and will in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawing(s), in which.

DETAILED DESCRIPTION OF THE INVENTION

Figure 1:
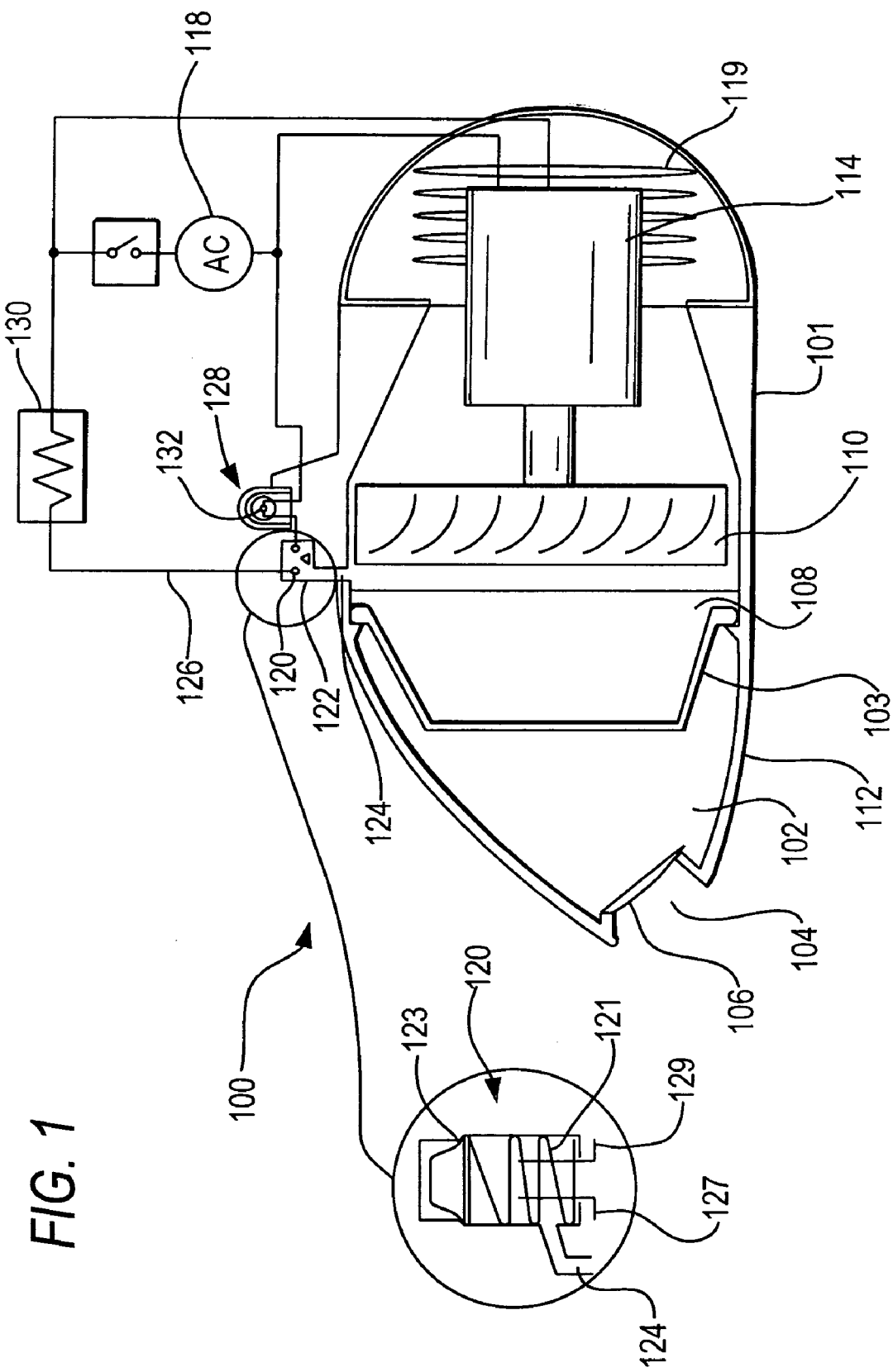
FIG. 1 is a schematic illustration of a vacuum cleaner having a pressure actuated electrical switch for measuring the pressure between the filter media and a flow inducing device constructed and arranged in accordance with the invention.

FIG. 1 illustrates a schematic of a vacuum cleaner 100 constructed and arranged in accordance with the invention. Vacuum cleaner 100 includes a motor housing 111 and a nozzle housing 112 formed with an inlet orifice 104, a filter chamber 102. A filter 103 is disposed in forming filter chamber 102 in the downstream side thereof. Intake orifice 104 may be provided with a flow restrictor 106, such as a flap or hinged door, to limit the flow of air or material out of filter chamber 102 through orifice 104. Filter chamber 102 is coupled to a flow chamber 108 containing a vacuum source, such as a fan or impeller 110 for creating a flow across filter 103. Fan or impeller 110 is driven by a motor 114. Although the layout shown utilizes a direct drive between motor 114 and impeller 110, many variations of methods for generating the flow of air across filter 103 are known in the art. The present usage of the directly driven impeller is not intended to limit the applicability of the present invention to any specific form of vacuum cleaner. Flow chamber 108 may be connected to an exhaust 116 formed at the downstream side of housing 101. This allows an air stream entering housing 101 at intake orifice 104 and passing through filter 103 to be exhausted from flow chamber 108.

A power source 118, such as an alternating current ("AC") source, may be provided for motor 114 for vacuum cleaner 100. Power source 118 may be chosen to be compatible with the location in which vacuum cleaner 100 is intended to be used, such as the use of an AC circuit in a house, or a direct current ("DC") circuit in an environment wherein vacuum cleaner 100 is intended to be used in an automobile. Alternately, power source 118 may be separate from motor 114 or other device used to generate the air flow in vacuum cleaner 100.

A pressure actuated switch 120, such as a diaphragm switch including a conductive washer 123 is mounted on a circuit board within housing of vacuum cleaner 122. Pressure actuated switch 120 connected through a port and tube 124 to flow chamber 108, such that the pressure of air in the flow chamber 108 may be communicated to the pressure actuated switch 120. When pressure in flow chamber 108 drops below a pre-determined minimum pressure threshold, switch 120 in a circuit 126 connecting some form of an indicator 128 with power source 118 is completed. Additional circuitry 130 may be included to conform current flow through circuit 126 to the requirements of the chosen indicator 128. For example, a 2.2 kOhm resistor may be placed in series in circuit 126 by leads 127 and 129 utilizing a 120 Volt alternating current power supply to reduce the voltage across the circuit to a level compatible with a chosen lamp, such as a neon indicator lamp.

Indicator 128 shown is light 132, such that when the pressure in flow chamber 108 increases above the threshold pressure, light 132 is energized, indicating to an operator that filter 112 requires cleaning or replacing. Light 132 may be an incandescent light, a light emitting diode, or any other light emitting device capable of generating a sufficient illumination to indicate to a user the need to clean or replace the filter 112. A light 132 is the presently preferred indicator 128, however an audible signal may be used. Audible signals are hampered, however, due to the likelihood of the signal being lost in noise generated by the vacuum cleaner.

Pressure switch 120 is electrical with an internal spring 121 that moves once the pressure changes. One end of tube 124 is attached directly to pressure switch 120 and the other end of tube 124 is placed between suction motor 114 and filter 203. Thus, when filter 103 becomes clogged with dirt, the pressure will change. Pressure switch 120 this embodiment is rated 19.5 kPa +/−0.75 kPa. However, the initial sealed suction of each vacuum cleaned model is different so the exact pressure drop will be different for each model. H is necessary to correlate the pressure drop to the airflow (CFM) because one wants filter indicator 132 to activate before the vacuum cleaner nozzle stops operating correctly since performance is directly related to airflow.

Figure 2:
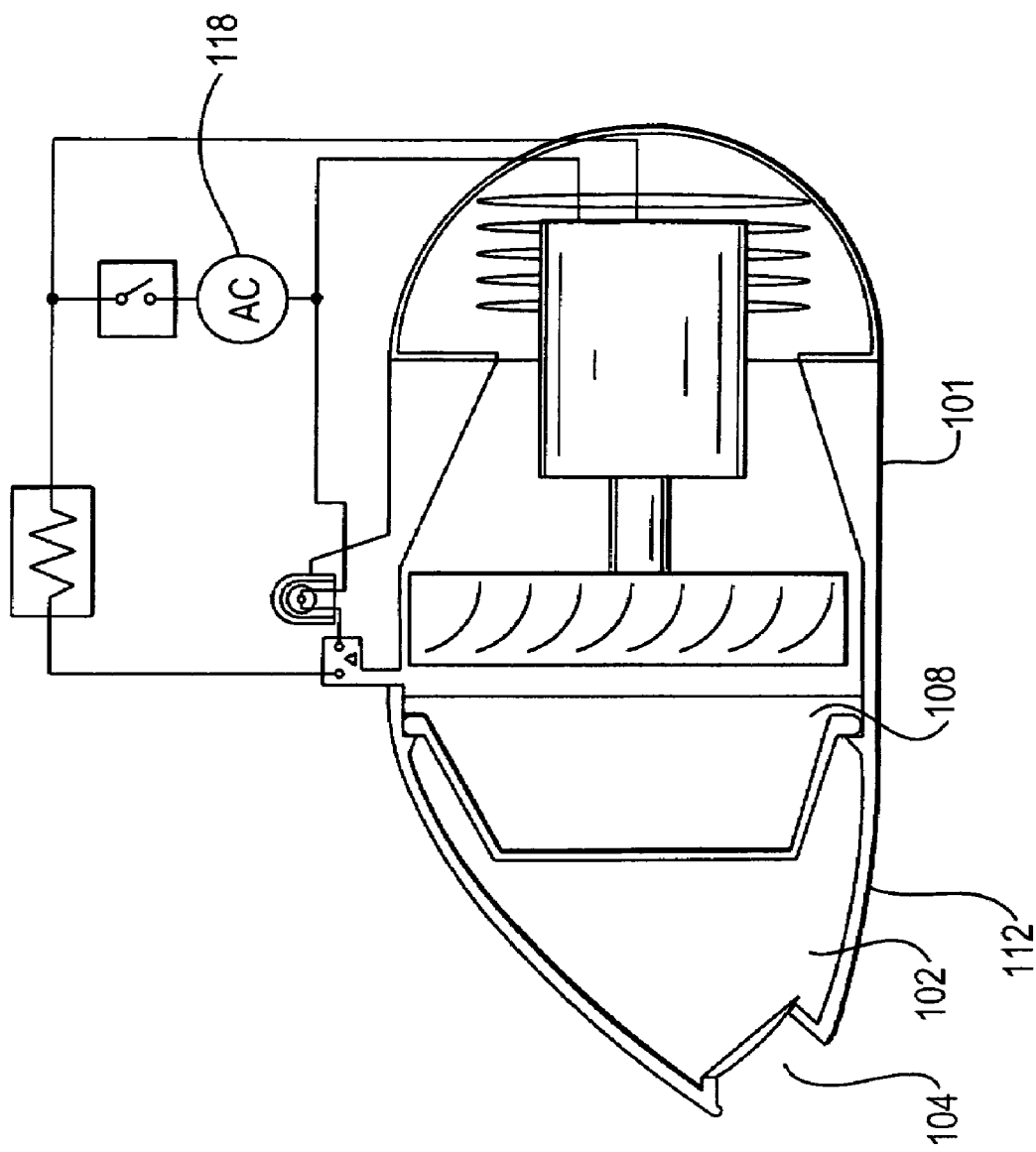
FIG. 2 is a schematic illustration of the vacuum cleaner pressure actuated electrical switch responding to pressure differential upstream and downstream of the filter.

As shown in FIG. 2, pressure switch 120 may be implemented such that switch 120 detects pressure variations across filter 112, rather than against an absolute value. If the flow of air into filter chamber 102 is restricted, such as by the intake inlet 104 being blocked, the pressure in flow chamber 108 may decrease based on the blockage of inlet 104, rather than on flow impedance generated by a full or dirty filter. In such a case, pressure switch 120 could indicate that the filter required cleaning or changing, when the filter was not the source of the flow impedance. By implementing a pressure port 202 between filter chamber 102 and flow chamber 108, the pressure differential between filter chamber 102 and flow chamber 108 could be utilized to reduce the likelihood of false indications.

Figure 3:
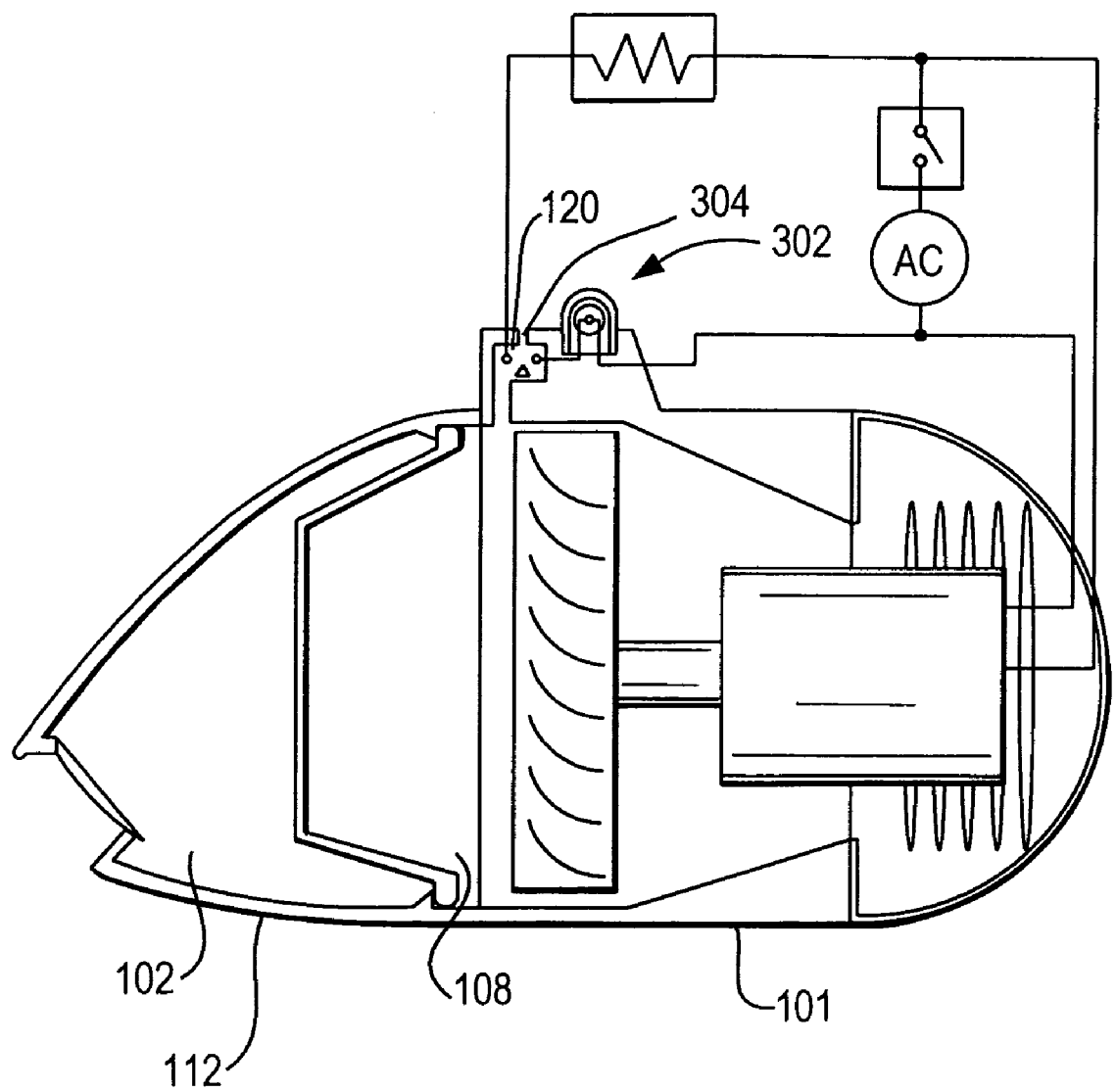
FIG. 3 is a schematic illustration wherein the pressure actuated electrical switch responds to pressure differential downstream of the filter and ambient pressure.

As shown in FIG. 3, pressure switch 120 may be implemented to determine a pressure differential between flow chamber 108 and ambient air pressure 302. Such a configuration could be implemented where a sufficiently small pressure differential is desired to be the threshold level for generating an indication that variations in ambient air pressure 302 would limit the effectiveness of the indication. Such a condition could occur where low restriction filtration means were implemented, such as through the use of a cyclonic separator, rather than through a more traditional filter media. An ambient pressure port 304 is provided to one side of pressure actuated switch 120, such that switch 120 would actuate based on a pressure differential between the pressure in flow chamber 108 and ambient air pressure 302.

Figure 4:
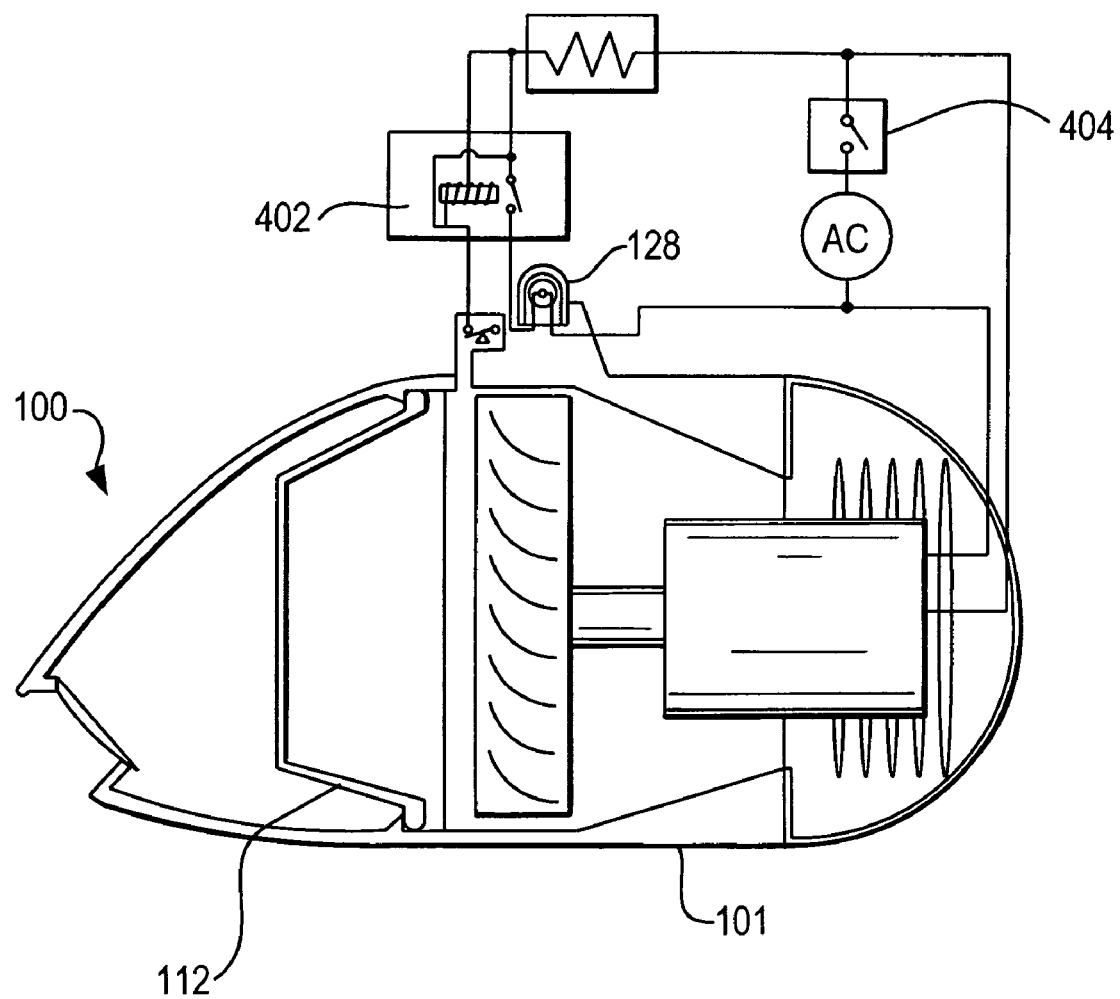
FIG. 4 is a schematic illustration wherein a pressure actuated electrical switch responds to pressure differential downstream of the filter and a latching relay is used to maintain the indicator illuminated once a pressure threshold is met.

As shown in FIG. 4, a latching relay 402 may be incorporated to cause indicator 128 to continuously indicate the need to clean or change filter 112 once a pressure threshold or differential is met. By placing main power switch 404 in such a position in circuit 126 that power to latching relay 402 is interrupted when power to vacuum cleaner 100 is switched off, latching relay 402 will release each time the power is interrupted, and only relatch if a pressure threshold or differential is met.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawing(s) shall be interpreted as illustrative and not in a limiting sense.

It will thus be seen that the objects set forth above, among those made apparent from the preceding description, are efficiently attained and, since certain changes may be made in the above composition of matter without departing from the spirit and scope of the invention, it is intended that all matter contained in the above description shall be interpreted as illustrative and not in a limiting sense.

The invention may be embodied in other specific forms without departing from the spirit or essential attributes of the invention. Accordingly, reference should be made to the appended claims, rather than the foregoing specification, as indicating the scope of the invention.

What is claimed is:

1. A vacuum cleaner having a monitor for sensing the pressure in the flow chamber, comprising:
    a housing having an inlet and an outlet;
    a motor mounted in the housing;
    a nozzle for receiving an intake device;
    a filter disposed between the nozzle and the motor to form a flow chamber between the filter and the motor;
    an indicator means for indicating a need to service the filter; and
    circuitry connecting the indicator means to a power source including a pressure actuated switch operatively connected to the flow chamber;
    the pressure actuated switch closing the circuit between the power source and the indicator when the pressure in the flow chamber is below a pre-determined minimum pressure threshold thereby indicating that the filter requires cleaning or replacement.

2. The vacuum cleaner of claim 1, wherein the circuit includes a latching means for latching the indicator in an indicating condition after a pressure indicating a need to clean or replace the filter has been detected.

3. The vacuum cleaner according to claim 1, wherein the indicator is a light.

4. The vacuum cleaner of claim 3, wherein the light is an incandescent bulb.

5. The vacuum cleaner of claim 3, wherein the light is a light emitting diode.

* * * * *